United States Patent
Lim et al.

(10) Patent No.: US 10,217,287 B2
(45) Date of Patent: Feb. 26, 2019

(54) METHOD AND APPARATUS FOR GENERATING A SEARCH PATTERN FOR AN INCIDENT SCENE

(71) Applicant: MOTOROLA SOLUTIONS, INC, Chicago, IL (US)

(72) Inventors: Bing Qin Lim, Jelutong (MY); Alfy Merican Ahmad Hambaly, Bayan Baru (MY); Shijie Hua, Puchong (MY); Chew Yee Kee, Alor Setar (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 97 days.

(21) Appl. No.: 15/390,471

(22) Filed: Dec. 24, 2016

(65) Prior Publication Data

US 2018/0182170 A1     Jun. 28, 2018

(51) Int. Cl.
| | | |
|---|---|---|
| G09G 5/00 | (2006.01) | |
| G06T 19/00 | (2011.01) | |
| G06K 9/00 | (2006.01) | |
| G06T 11/60 | (2006.01) | |
| G06Q 50/26 | (2012.01) | |
| G06Q 10/06 | (2012.01) | |
| G06F 3/01 | (2006.01) | |
| G06F 17/30 | (2006.01) | |

(52) U.S. Cl.
CPC ............ *G06T 19/006* (2013.01); *G06F 3/011* (2013.01); *G06K 9/0063* (2013.01); *G06Q 10/06311* (2013.01); *G06Q 50/26* (2013.01); *G06Q 50/265* (2013.01); *G06T 11/60* (2013.01); *G06F 17/30864* (2013.01); *Y04S 10/54* (2013.01)

(58) Field of Classification Search
None
See application file for complete search history.

(56) References Cited

U.S. PATENT DOCUMENTS

| | | | |
|---|---|---|---|
| 6,816,075 B2 | 11/2004 | Grunes et al. | |
| 8,998,083 B2 | 4/2015 | MacIntyre | |
| 9,235,870 B2 | 1/2016 | Kottoor et al. | |
| 9,852,606 B1 * | 12/2017 | Heier | G08B 25/004 |
| 2003/0210228 A1 | 11/2003 | Ebersole | |

(Continued)

FOREIGN PATENT DOCUMENTS

WO     2014100688 A2     6/2014

OTHER PUBLICATIONS

Texas Association of Police Explorers, "Crime Scene Search and Processing", Sep. 5, 2012, URL: https://web.archive.org/web/20120905120407/http://www.co.wise.tx.us/constable/downloads/crime%20scene%20search%20and%20processing.pdf.*

(Continued)

*Primary Examiner* — David H Chu

(57) ABSTRACT

A portable communication device receives evidence information pertaining to an incident scene along with a plurality of incident scene contextual factors pertaining to the evidence information and the incident scene. An optimum search pattern is calculated and displayed as part of an augmented reality of the incident scene. The contextual factors can be weighted to generate an optimum search pattern, such as for different individual user-investigators working at an incident scene or for certain tools being used at an incident scene.

12 Claims, 10 Drawing Sheets

(56) References Cited

U.S. PATENT DOCUMENTS

| | | | |
|---|---|---|---|
| 2007/0005233 A1 | 1/2007 | Pinkus et al. | |
| 2009/0171961 A1* | 7/2009 | Fredrickson | G06Q 10/06 |
| 2015/0112581 A1 | 4/2015 | Hakim | |
| 2016/0054791 A1 | 2/2016 | Mullins et al. | |
| 2016/0342752 A1* | 11/2016 | Stueckemann | G06F 19/328 |
| 2017/0223302 A1* | 8/2017 | Conlan | H04N 5/44504 |
| 2017/0256283 A1* | 9/2017 | Yajima | G11B 20/10527 |
| 2017/0301140 A1* | 10/2017 | Smith | G02B 27/017 |
| 2017/0322705 A1* | 11/2017 | Conway | G06F 3/04842 |
| 2018/0061138 A1* | 3/2018 | Neeter | G06T 19/006 |
| 2018/0080774 A1* | 3/2018 | Sink | G01C 21/206 |

OTHER PUBLICATIONS

What-when-how, "Crime Scene Search and Evidence Collection (police)", Sep. 8, 2012, URL: https://web.archive.org/web/20120908020046/http://what-when-how.com:80/police-science/crime-scene-search-and-evidence-collection-police.*

The International Search Report and the Written Opinion, corresponding patent application No. PCT/US2017/066079 filed Dec. 13, 2017, dated Feb. 27, 2018, all pages.

* cited by examiner

IDENTIFIED CONTEXT FACTOR

METHOD AND APPARATUS FOR GENERATING A SEARCH PATTERN FOR AN INCIDENT SCENE

RELATED APPLICATIONS

This application is related to co-pending U.S. application Ser. No. 15/390,470 and co-pending U.S. application Ser. No. 15/390,472 commonly assigned to and owned by Motorola Solutions, Inc.

FIELD OF THE INVENTION

The present invention relates generally to communication systems that facilitate searching incident scenes for evidence, and more particularly to a portable electronic device that provides a search pattern.

BACKGROUND

Communication systems, particularly those used in public safety environments such as law enforcement, fire rescue, and mission-critical environments, are often called upon to investigate an incident scene, whether it be the crime scene, accident scene or other incident scene involving forensic analysts and investigators. It is not uncommon for numerous individuals, some from different job functions and backgrounds, to show up at an incident scene for the gathering and preservation of evidence. For example, crime scene investigators, first responders, forensic specialists, may be just a few of the individuals involved in searching an incident scene.

Current search procedures often involve low-tech physical coordination of individual investigators using tools like rope, tape, walking formations and basic search patterns. Upon locating a piece of evidence, investigators often need to wait while the evidence is collected. These search processes become time consuming and inefficient.

Accordingly, there is a need for a method and apparatus to facilitate the search of an incident scene.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
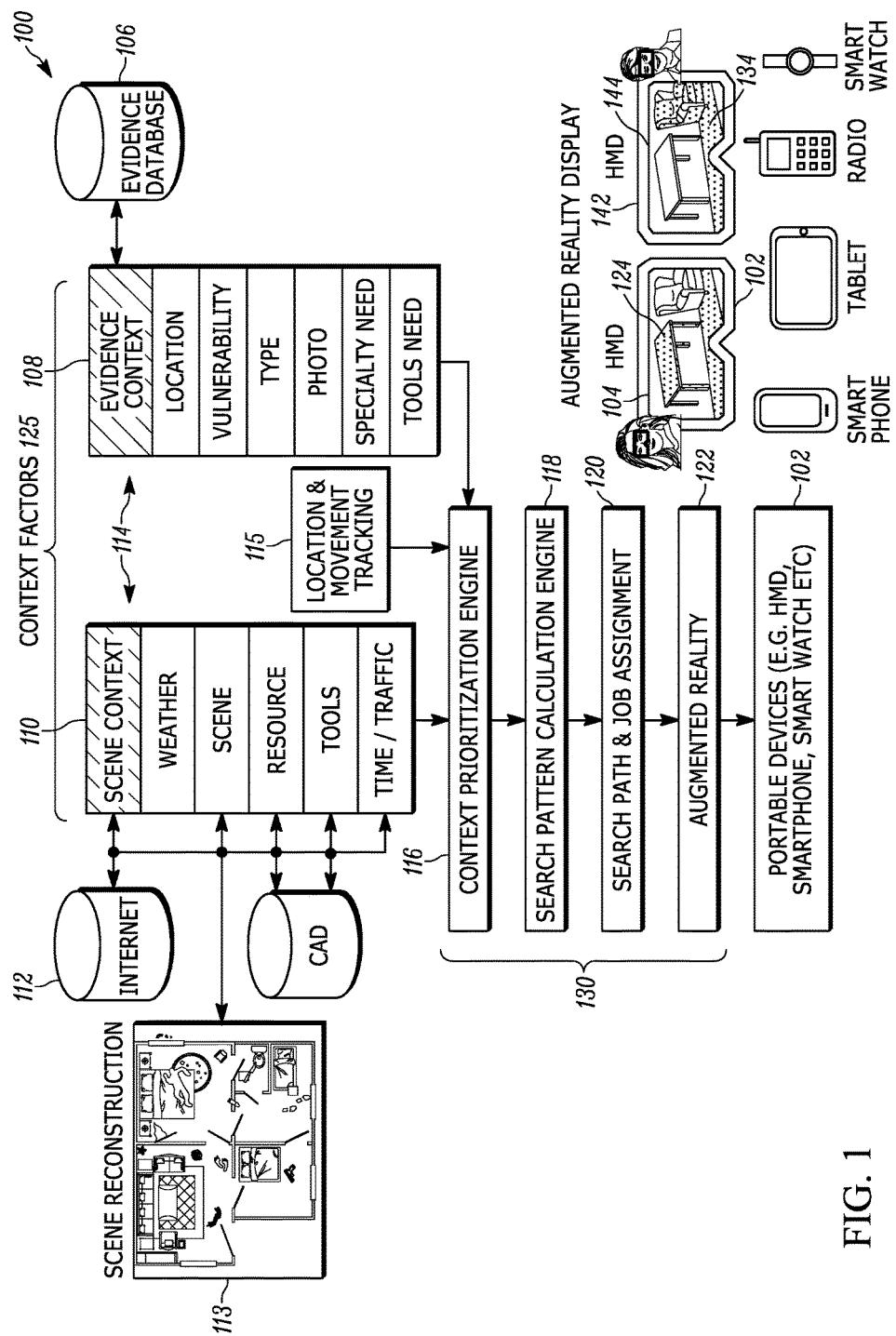
FIG. 1 is an operational block diagram of a communication system formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein a system, apparatus, and method for generating a search path and/or pattern for searching an incident scene. Information from a plurality of context factors related to the movement and tracking location of resource parameters along with incident scene parameters and evidence context parameters are input into a context prioritization engine. The search path/pattern is intelligently calculated and assigned to an individual user-investigator and dynamically changed based on the contextual factors. A plurality of individual user-investigators may be assigned their own customized path/pattern based on user experience, such as part of a user profile. An optimized search path/pattern is communicated via an augmented display of a portable communication device to the individual performing the search. The search paths and patterns can now be intelligently generated, assigned and dynamically updated for different user-investigators collaborating at an incident scene based on the plurality of contextual parameters.

FIG. 1 is a communication system 100 formed and operating in accordance with the embodiments. Communication system 100 comprises a portable communication device 102, and 142, such as a tablet, smart phone, smart watch, head mounted display (HMD), or portable two-way radio, each having a display 104, 144 respectively for presenting an optimal search pattern or path for an incident scene in accordance with the embodiments. The communication system 100 comprises an evidence database 106 for inputting, storing and retrieving a plurality of evidence context information 108. Contextual incident scene parameters 110 pertaining to the scene itself can be determined or retrieved. The evidence context parameters and incident scene context parameters are collectively referred to as evidence attributes 114.

In accordance with the embodiments, location and movement tracking 115 of investigator resources 115 take into account the position of currently available user-investigators at an incident scene. Different investigator resources may have different levels of seniority, areas of expertise, and skill sets. Different investigators located within the incident scene can be tracked using such techniques as GPS, laser scanner, indoor location tracking, inertia sensors (e.g. accelerometer, gyroscope), magnetometer, beacon triangulation, image sensor, infrared camera and the like.

In accordance with the embodiments, the evidence attributes 114 (evidence context parameters and incident scene context parameters) and location and movement tracking parameters of resources 115 are collectively referred to as 'context factors' 125 and are input into the context prioritization engine 116 of a controller 130 of the one or more portable communication devices 102, 142.

The evidence context parameters 108 can be gathered, for example, during an initial walkthrough of an incident scene, such as incident scene 113. The initial gathering and determining of evidence context information may include such evidence context parameters as electronically tagging, via the portable communication device, location of the evidence. For example, evidence type can be entered, such a gun, blood splatter, broken window, footprint, to name a few. The initial gathering and determining of evidence context information may further comprise photos of the incident scene and particularly pieces of evidence within the incident scene. Special needs for particular types of evidence can be noted, for example a predetermined or desired virtual geofenced safeguarded area for particular types of evidence can be entered or if previously stored for certain types of evidence, then retrieved.

Contextual incident scene parameters 110 pertaining to the scene itself can be determined or retrieved. For example contextual parameters can be determined during an initial assessment of the incident scene 113, such as access and alternate access, to the incident scene, door tracks and window ledges at the incident, and any particular search boundaries can be noted. Additional examples of incident scene context parameters can be gathered pertaining to searchable parameters on the internet, such as weather (rain, wind conditions, snow, salt air, etc.) and traffic (rush hour, timed occurrence of bridge status) which are all retrievable via internet access 112. Hence, any context scene parameter that might be a source that could or might impact (put at risk) a certain piece of evidence will be input, either to the internet database 112 and/or the evidence database 106.

In accordance with the embodiments, an optimum search pattern is calculated for each portable device 102, 142 based on context factors 125. In accordance with the embodiments, the context factors 125 are derived from: scene context, evidence context, and user location and movement context parameters. Weighted factors associated with different context factors 125 can be applied to the calculation. For example priority weighting can be assigned to optimize search patterns for more experienced investigators, or investigators having expertise in a predetermined area being located at an incident location. Optimized search patterns can be generated and assigned to individual investigators best suited to address various context factors 125 associated with certain types of evidence. The calculated search pattern is adjustable so that the search path or pattern can be updated based on real-time changes to the incident scene.

The context factors 125 are input into a controller 130 of one or more portable communication devices 102, 142. Controller 130 comprises context prioritization engine 116, a search pattern calculation engine 118, search pattern job assignment 120, and augmented reality 122 to provide the one or more portable communication devices 102 with an augmented reality search pattern 124, and an augmented reality search pattern 134 to portable communication device 142.

The context prioritization engine 116 determines and applies prioritization of weighted factors as appropriate to context factors 125 prior to the search pattern being calculated. For example, evidence context parameters (108) dealing with certain types of evidence at risk of being contaminated, lost or damaged should be ranked a higher weighted priority than those not at risk. In accordance with the embodiments, scene context parameters (110) pertaining to the identification of resources, such as user-investigator resources working at the incident scene and/or additional user-investigator resources being tracked and moving to the location incident scene should be ranked with a prioritized weighting factor for job assignment.

The search pattern is calculated by the search pattern calculation engine 118, and then the calculated patterns is assigned to an appropriate investigator (job assignment) at 122 taking into account all context factors 125 with prioritization applied as appropriate. In situations, for example where only one or two individuals are at an incident scene, the search pattern will be optimized to accommodate for the user's experience. For example, a more complex search pattern will be assigned to a more experienced user-investigator, and a simpler search pattern will be assigned to a more junior, inexperienced user-investigator. For a plurality of different users with different user expertise and/or seniority, the search patterns are adjustable and assigned accordingly to different users. For example device 102 having display 104 displays augmented reality search pattern 124, while device 142 having display 144 displays a different augmented reality search pattern 134 for a different user. If, for some incident scene searches, only one optimized search path is to be used, then the calculated optimized search pattern can be re-assigned or transferred to another more appropriate investigator based on user context.

Depending on the number of user-investigators and the interaction between the investigators at the incident scene, one augmented search path or pattern is displayed per user device. However, all of the augmented search paths or patterns may be displayed on the augmented display of a user's device, if selected based on user selectable options of the portable communication device. For incident scenes where it may be preferable to leave a calculated search pattern or path alone, the communication system 100 is able to refer back to context parameters pertaining to user resources, for example stored for a plurality of different user investigators, to transfer a search assignment to the most appropriate investigator. Thus, if an initial investigator is unable to perform the search or can only perform the search within a limited capacity, the optimized search path/pattern can be re-assigned to another user-investigator. Either way, communication system 100 provides for an improved generation of a search pattern or path for an incident that is optimized based on context factors 125 that include a user-investigator's profile and is adjustable based on changes to the context factors, whether the changes occur to the incident scene or to the individual working at the incident scene.

Figure 2:
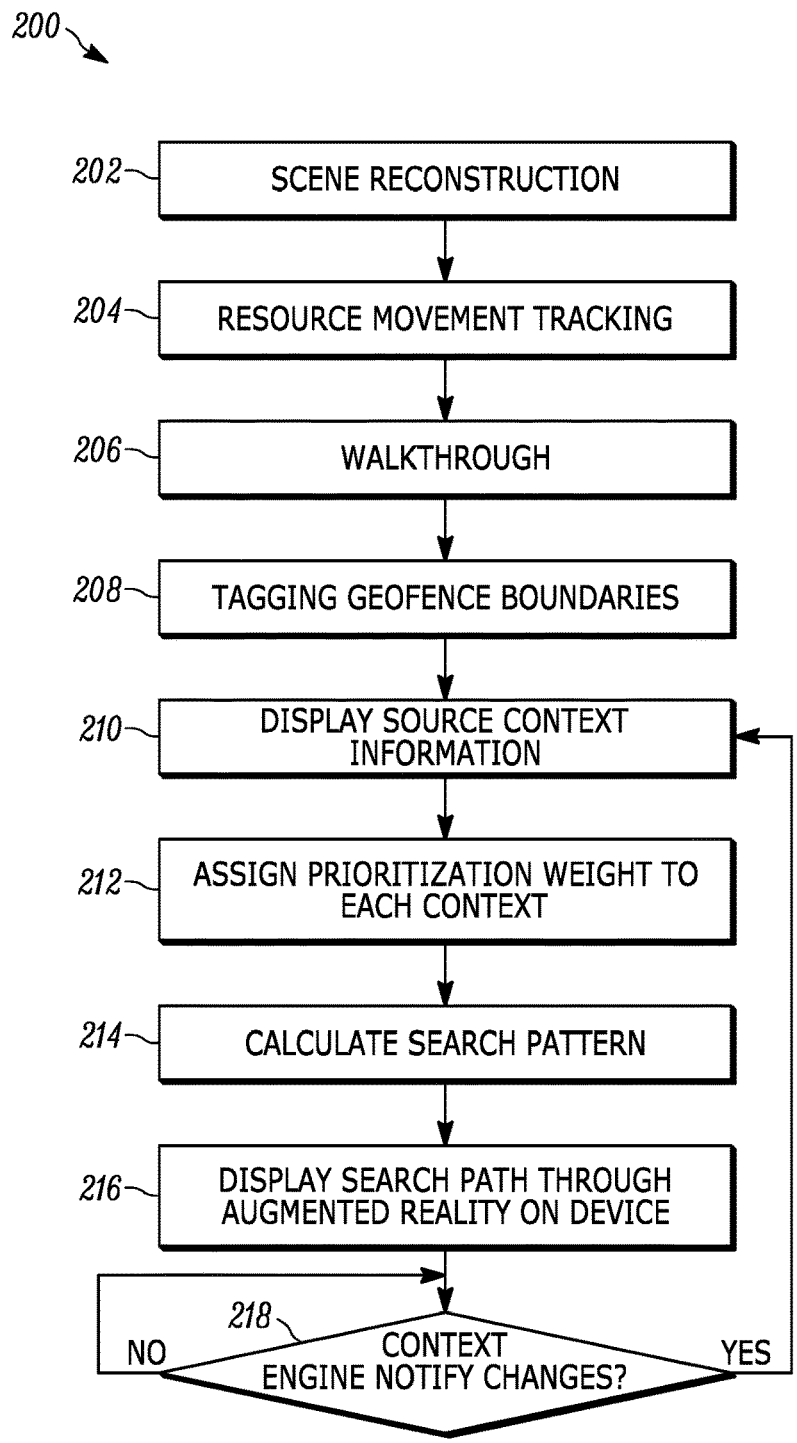
FIG. 2 is a method for generating a search pattern or pattern in accordance with some embodiments.

FIG. 2 is a method 200 for generating a search pattern in accordance with some embodiments. Beginning at 202 the initial incident scene is reconstructed using known techniques of 3D laser scanning, RTK, and/or drones and the like for scene reconstruction. Tracking of investigator resources, individual user-investigator locations are tracked at 204. Geofenced boundaries of areas to search are defined at 206 along with electronic tagging of initial evidence at 208.

The method 200 continues in accordance with the embodiments, by taking the source context factors and displaying it as part of the augmented reality of the incident scene on a display of a portable communication device at 210. The source context information can be extracted from the initial walkthrough 202, 204, 206 along with other databases and entered information, such as was discussed in FIG. 1. Context factors may comprise evidence type, incident scene type, location and movement tracking of user-investigator resources and their profiles. Prioritization weights may be assigned to one or more context factors, at 212 (scene, evidence, and/or location movement tracking). A search pattern is calculated at 214 and displayed as part of the augmented reality on the portable communication device at 216 based on the contextual factors. Changes occurring to the context factors (changes to the incident scene, evidence, and/or location movement tracking) are provided to the context engine at 218. As changes are entered into the context engine at 218, the method returns to update the source context information at 210 to enable displaying an adjusted search path/pattern at 216 as part of the augmented display.

For example, the displayed search path or pattern can be adjusted based on changes in weather conditions (incident scene context), and identified hazards (incident scene context) within the incident scene layout. The displayed search path can be further adjusted based on additional user-investigator resources being added to an incident scene location (location and movement tracking context). The search patterns or paths may be adjusted based on newly found evidence (evidence context). All of the context factors can be re-weighted again at 212 and the search path adjusted at 214 for an optimized pattern for an individual.

Accordingly, method 200 allows for dynamic changes to take place at an incident scene without disrupting a search by updating and adjusting an optimized search pattern or path for viewing via an augmented display at 216

Figure 3A:
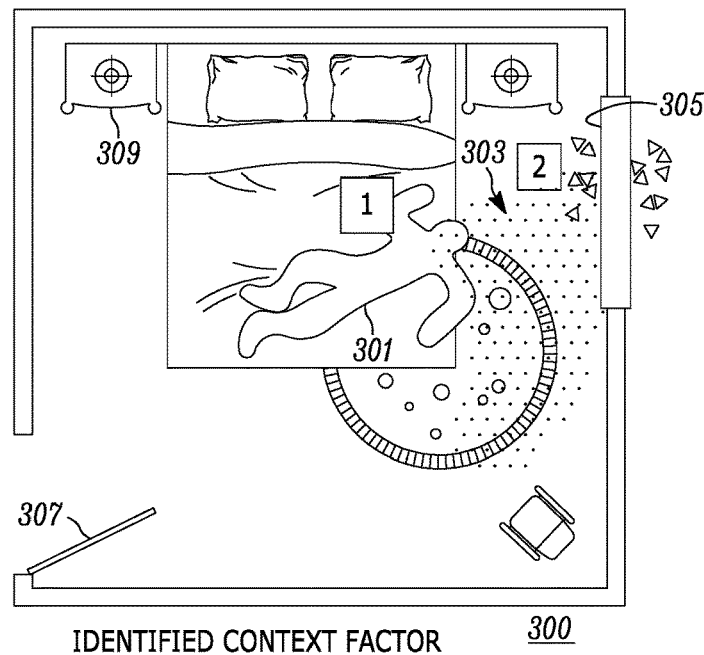
FIG. 3A shows a non-augmented incident scene display having initial context factors identified for entering into a search engine of a portable communication device.

For example, FIG. 3A shows an example of an incident scene 300 prior to any path patterning. Incident scene 300 comprises initial context factors pertaining to incident scene type, evidence type, and user-investigator resource location and movement tracking. For example initial context factors may comprise evidence parameters, such as electronic evidence tag 1 for a body 301, evidence tag 2 for a blood splatter 303, and additional context factors identifying incident scene context parameters, such as a broken window 305, a door 307, various furniture layout 309. These initial context factors are entered into a portable communication device 302 shown in FIG. 3B as part of an initial walkthrough by a user-investigator 304 in accordance with some of embodiments. The initial walkthrough shows additional context factors being added to the display of portable communication device 302 such as a weather forecast 311, and a time of day 313. In accordance with the embodiments, the user profile and location of user-investigator 302 or other individual resources available at the scene may also form part of the context factors used in determining search patterns for an incident scene. For the purposes of describing the various embodiments, the user-investigator 304 will be considered a senior, more experienced user-investigator. Investigative tools used at the scene may also be included as part of the context factors in determining search patterns.

Figure 3B:
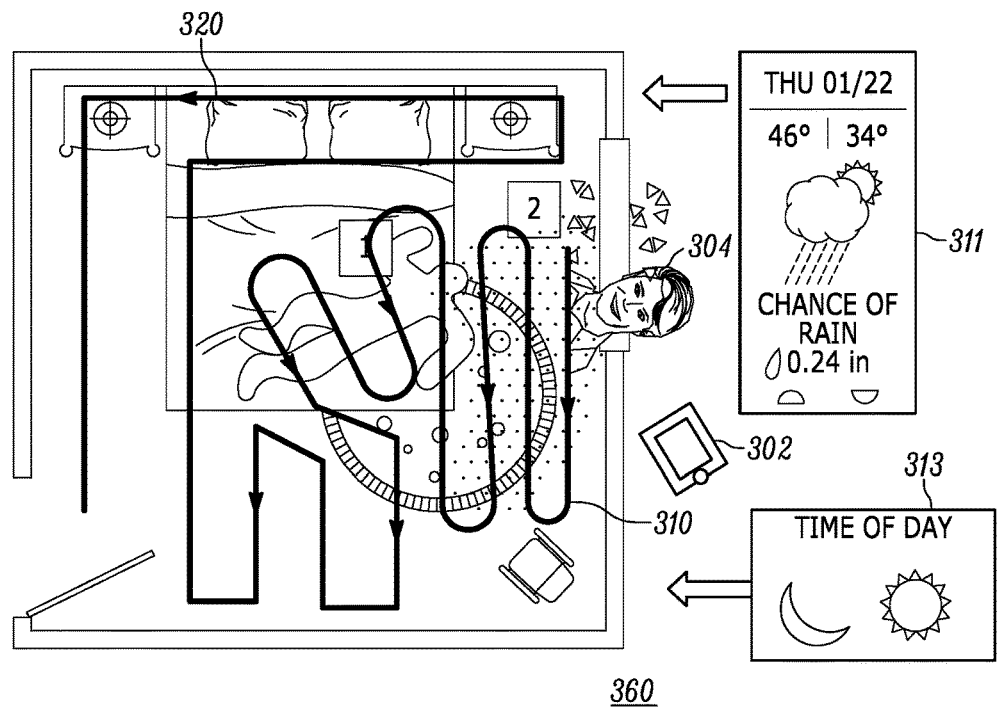
FIG. 3B is a display of a portable communication device showing an incident scene augmented with a search pattern in accordance with some of the embodiments.

An initial search pattern 310 is generated and displayed as part of augmented incident scene 360 based on incident scene parameters and evidence scene parameters and any location movement tracking of user-investigator 304 of the portable communication device 302 during the walkthrough. For example, if the forecast indicates rain, then evidence near the broken window should take place at the broken window location first or at least is secured at that location first. In FIG. 3B, the portable device 302 displays a complex search pattern 310 in the areas of electronic evidence tag 1 for a body 301, evidence tag 2 for a blood splatter 303 and a broken window 305 particularly of an experienced user-investigator. As device 302 belonging to user-investigator 304 moves further away from the evidence, for example moving towards a door of the room, context factors such as furniture layout can be used to generate a simplified search pattern portion 320. This simplified search pattern can be stored for later use. Evidence can be collected at locations noted for higher risk of contamination or loss.

Figure 3C:
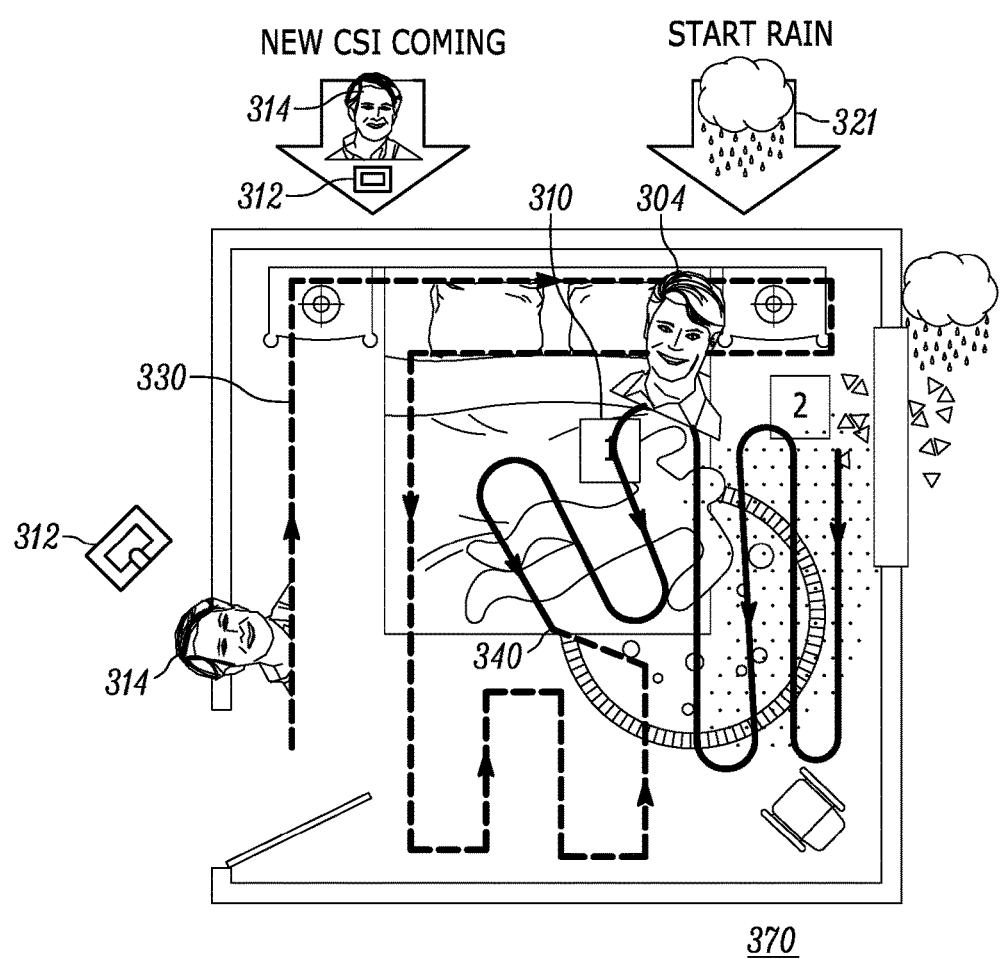
FIG. 3C is the display of the portable communication device showing an updated search pattern for a new user-investigator to the incident scene in accordance with some of the embodiments.

FIG. 3C shows an updated change in the search patterns on a displayed incident scene 370 based on dynamic change in one or more contextual factors in accordance with an embodiment. For example, a new junior user-investigator 314 operating a portable communication device 312, formed and operating in accordance with the embodiments, appears at the incident scene 300. An updated newly optimized and simplified path portion 330 is displayed at both the portable communication devices 302, 312 reflecting optimized patterns for the newly added user. The newly optimized patterns portion 330 will be based on the original pattern portion 320, while retaining the complex pattern portion for the more senior user-investigator 304. The calculation is based on any changes to the incident scene parameters, evidence scene parameters and any changes in location movement tracking of user-investigator 314 of the portable communication device 312.

Accordingly, search patterns and paths can be optimized for individual investigator resources associated with each individual investigator. Continuing to refer to FIG. 3C, the experienced user-investigator 304 using portable device 302 continues to search a complex area using the more complex patterns 310, and the more junior user-investigator 314 using portable device 312 will be automatically assigned to the previously stored simplest path (since this junior user has no individualized path as yet). The display is further updated in this example by an indicator that rainfall 321 has started. This type of incident scene context parameter might be stored along with time of day, and an indicator can be provided along the search patterns to indicate particular areas of interest.

Accordingly, context factors such as evidence type, incident scene type, individual user-investigator resources and location of those user-resources, tools, weather forecasts and time associated with the incident scene can all play a part in adjusting the search pattern.

Figure 3D:
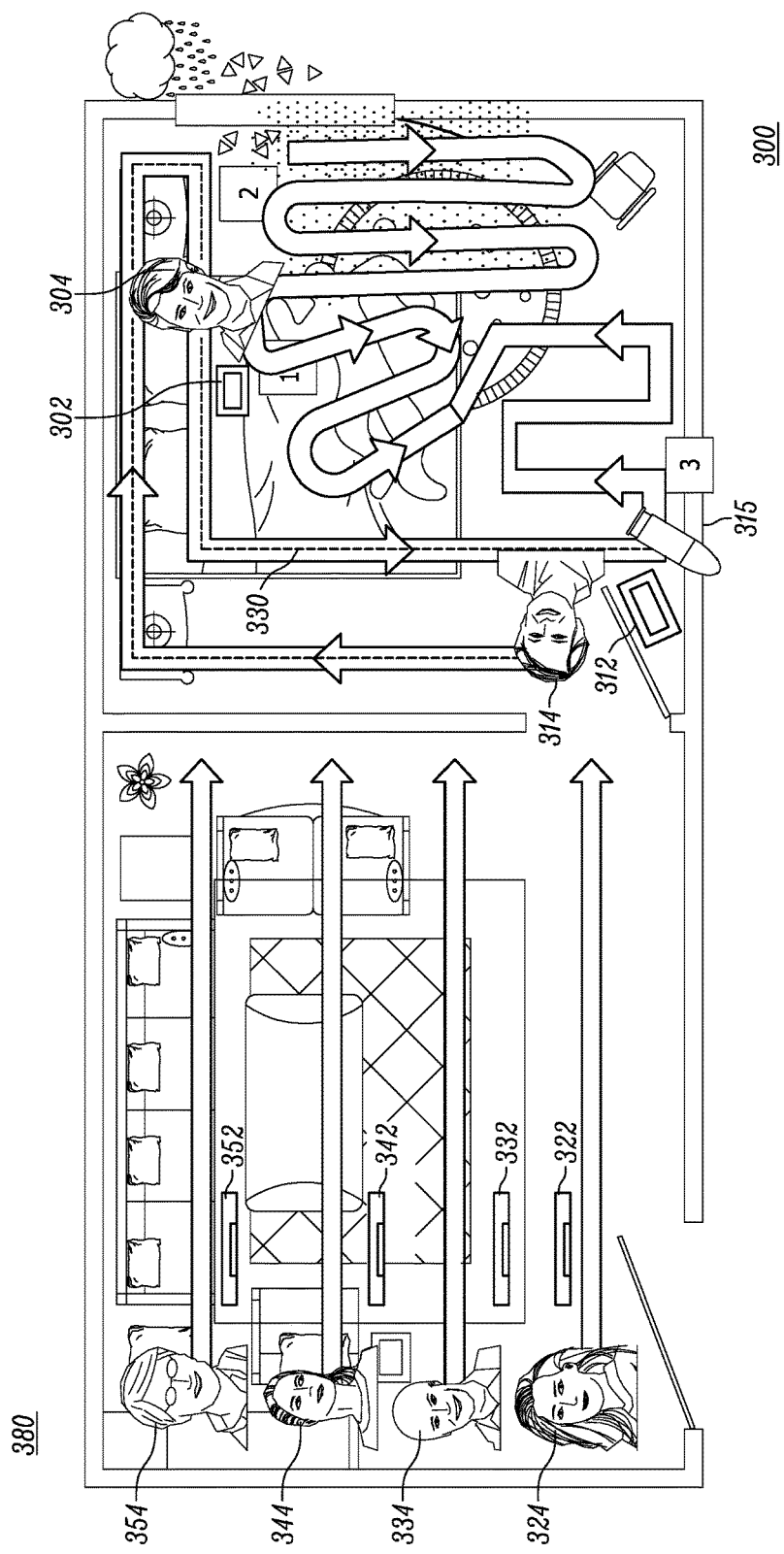
FIG. 3D is the display of the portable communication device showing an addition of user-investigators to an expanded incident scene in accordance with some of the embodiments.
Figure 3E:
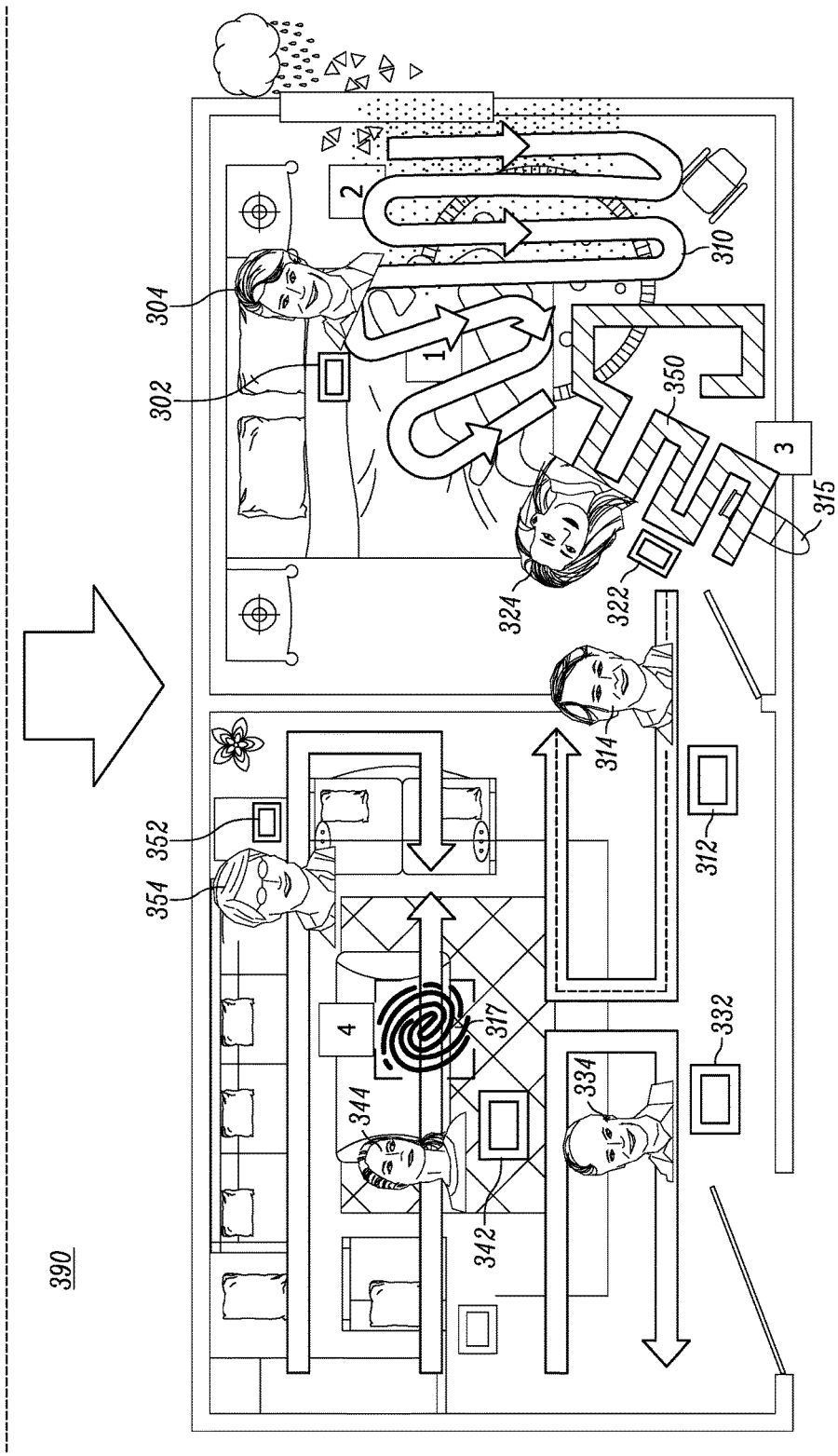
FIG. 3E is the display of the portable communication device showing an updated search pattern for an updated user assignment in accordance with some of the embodiments.

In accordance with further embodiments, the search pattern is also adjustable for based on real-time changes to the incident scene including, as shown next in FIGS. 3D and 3E, the addition of different investigators arriving on scene and how search patterns can be assigned to the most appropriate resource-individual. Also, automated requests can be made for automatically requesting, via the portable communication device, a specialist for predetermined types of evidence analysis.

Moving to FIG. 3D, additional user-investigators 324, 334, 344, 354 arrive and form part of an updated expanded incident scene 380, each having their own portable communication device 322, 332, 342, 352 operating in accordance with the embodiments. Junior user-investigator 314, using his device 312 as a guide for walking along the less complex path 330 has identified a piece of evidence and tagged it with an electronic evidence tag 3 for example, a bullet 315. However, junior user-investigator 314 being less experienced seeks out assistance via his portable device 312. Portable device 312 identifies the incoming group of user-investigators and further identifies user-investigator 324 as being a specialist in the desired area of interest, in this example that of bullet trajectory analysis. Junior user-investigator 314 may then be assigned to initially assist the specialist user-investigator 324 with the particular evidence 315 related to her field of expertise. For example, junior user-investigator 314 can advise the specialist 324 of any known damage to the area of any known issues with the evidence. For example, advising the specialist 324 on whether the bullet had been moved, touched, or stepped on since investigators arrived to the scene.

Device 322 automatically assigns an optimum search pattern 350 for user-investigator 324 to use for searching that evidence area. In this case, a bullet trajectory search pattern may be displayed as part of an augmented search pattern on the incident scene 390 as shown in FIG. 3E. Hence, appropriate user-investigators may be requested to assist or be automatically assigned based on resource location, availability and various types of experience for each user-investigator.

Moving to FIG. 3E, an updated incident scene 390 shows how user-investigator 324 has taken over the analysis at evidence tag 3, bullet location and has her own optimized pattern assigned based on her user-experience, such as to follow bullet trajectory. Portable communication device 322 is automatically uploaded with the latest information and updated for the current user-investigator 324. The device 312 under control of junior user-investigator 314 has been moved over to a different room of the scene to continue searching.

The optimized guide pattern will provide step by step guide navigation to guide the user to the right location. Each user-investigator need only see his/her own pattern displayed along with any navigation instructions to the specific location and along the pattern any alerts or indicators (for example color coded) along the indicative of areas to avoid and areas to focus on for evidence. However, in accordance with user based context embodiments, a user-investigator having a high ranking role or position, can choose to have an overall view of all the search paths assigned to all other user (officers, forensic specialists, and the like) to have an overall picture of who is searching where. This overall view can be enabled via a user interface, such as a. soft button press, at the portable communication device based on user context for that individual.

For the case of the portable communication device being embodied as a HMD, the search pattern will be augmented on the HMD display at the real scene. For other devices like a tablet, the tablet can be held up to show the search pattern as an augmented view or shown as floor plan view with zooming capability to the area based on the location of the investigator/officer. The displayed floor plan can move (pan) along as the user-investigator moves from one location to another location.

Similarly, user-investigator 344 has identified a piece of evidence and tagged it in a different room with an electronic evidence tag 4, for example, for a fingerprint 317 in another room. A different use-investigator 354 from the group of newcomers has been assigned to a pattern provided by portable device 352 and has come to assist user-investigator 344. All of the various paths can be displayed across the plurality of communication devices and as such every investigator is aware of the various portions of the incident scene being attended to.

Accordingly, the system, method and portable communication device provided by the embodiments ensure that certain types of evidence are analyzed by an appropriate investigator prior to being negatively impacted by some detrimental parameter. The optimal search patterns assigned to optimal user-investigators ensures that evidence is examined and/or collected as expeditiously as possible.

Figure 4A:
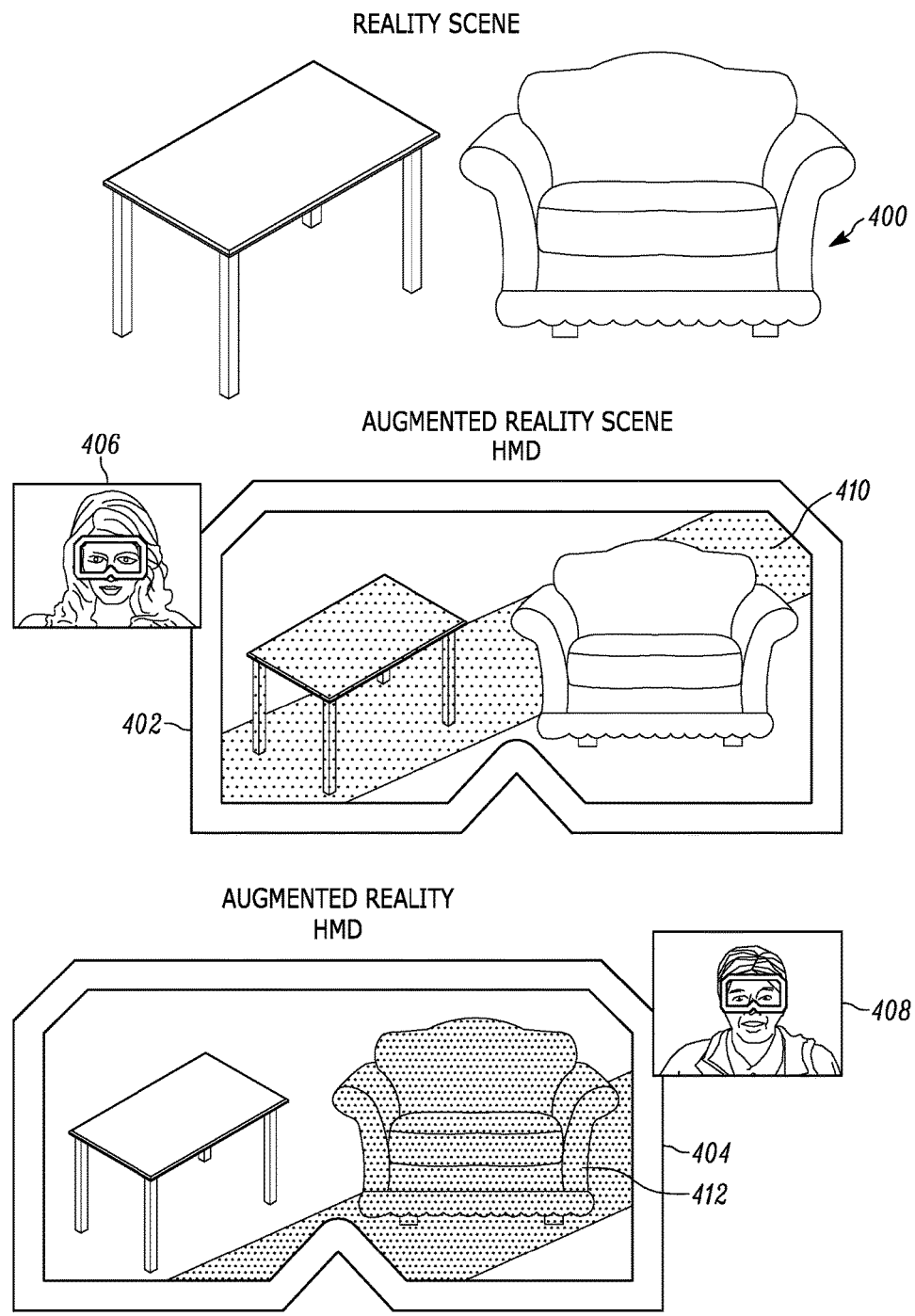
FIG. 4A shows an example of first and second portable communication devices having different augmented reality search patterns displayed thereon in accordance with some of the embodiments.

FIG. 4A shows an example of reality scene 400 and two different portable communication devices, shown as such as head mounted display (HMD) 402, 404 being worn by two different users 406, 408, each having augmented reality views with different search patterns 410, 412 displayed thereon in accordance with some of the embodiments. The different search patterns 410, 412 are generated as a result of different individual user profiles, such as user experience and area of expertise, to customize each search pattern.

Figure 4B:
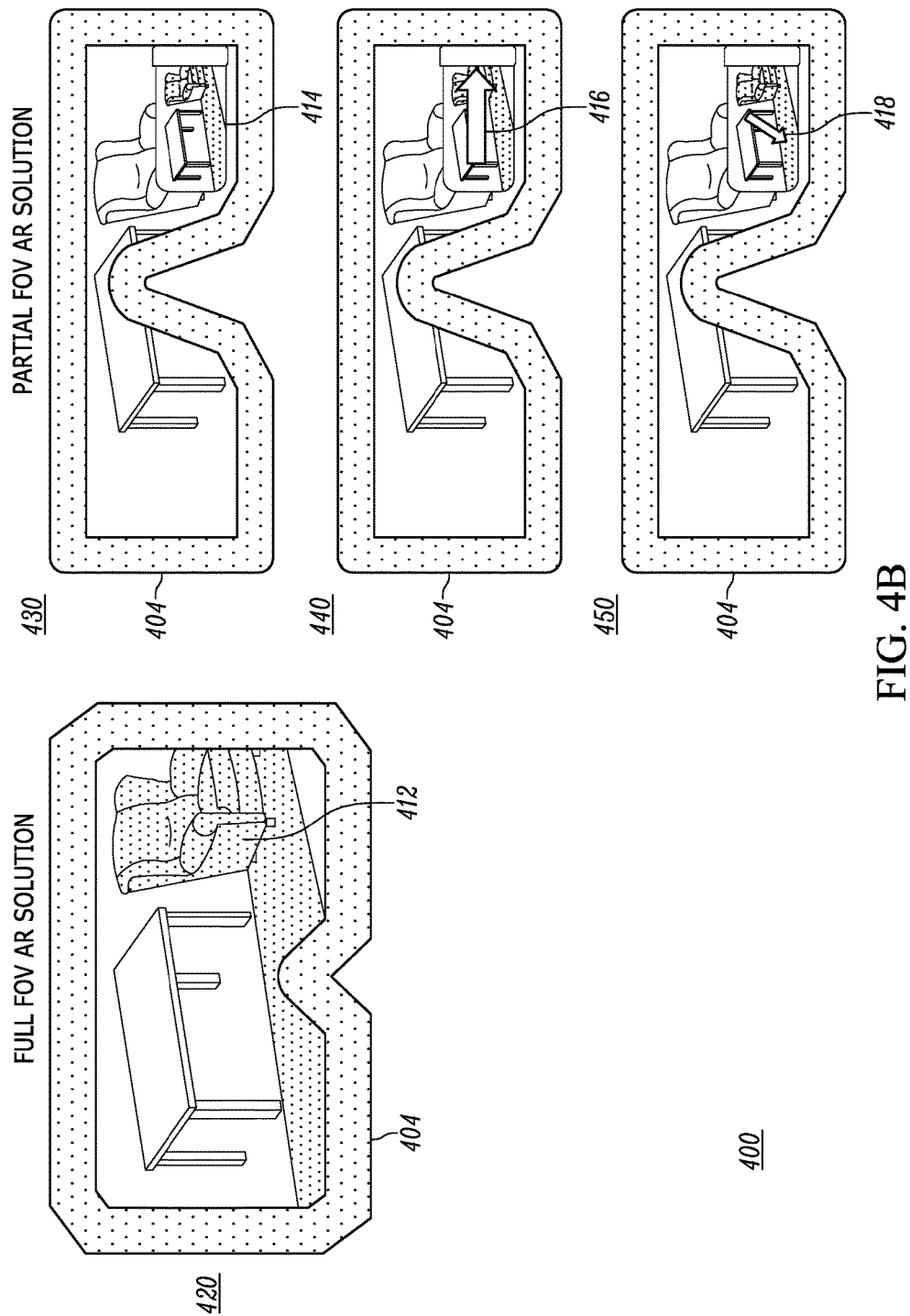
FIG. 4B shows one of the portable communication devices of FIG. 4A with examples of some partial field of view displays in accordance with some of the embodiments.

FIG. 4B shows the portable communication device 404 of FIG. 4A in accordance with some embodiments. In view 420, portable communication device 404 is embodied as shown previously as a head mounted display (HMD) with a full field of view (FOV) augmented reality search pattern 412. View 430 shows device 404 with a partial field of view 414, where the augmented pattern is displayed in a smaller display at the lower right corner of the HMD. View 440 shows a partial field of view, where the augmented pattern is displayed in a corner portion of the HMD with a directional arrow indicator 416 for the user to follow while moving along the pattern. View 450 shows a partial field of view, where the augmented resolution pattern is displayed in a corner portion of the HMD with a focused area of interest arrow indicator 418 to direct the user's attention to a specific area, for example to analyze a particular piece of evidence, while moving along the pattern.

Figure 5:
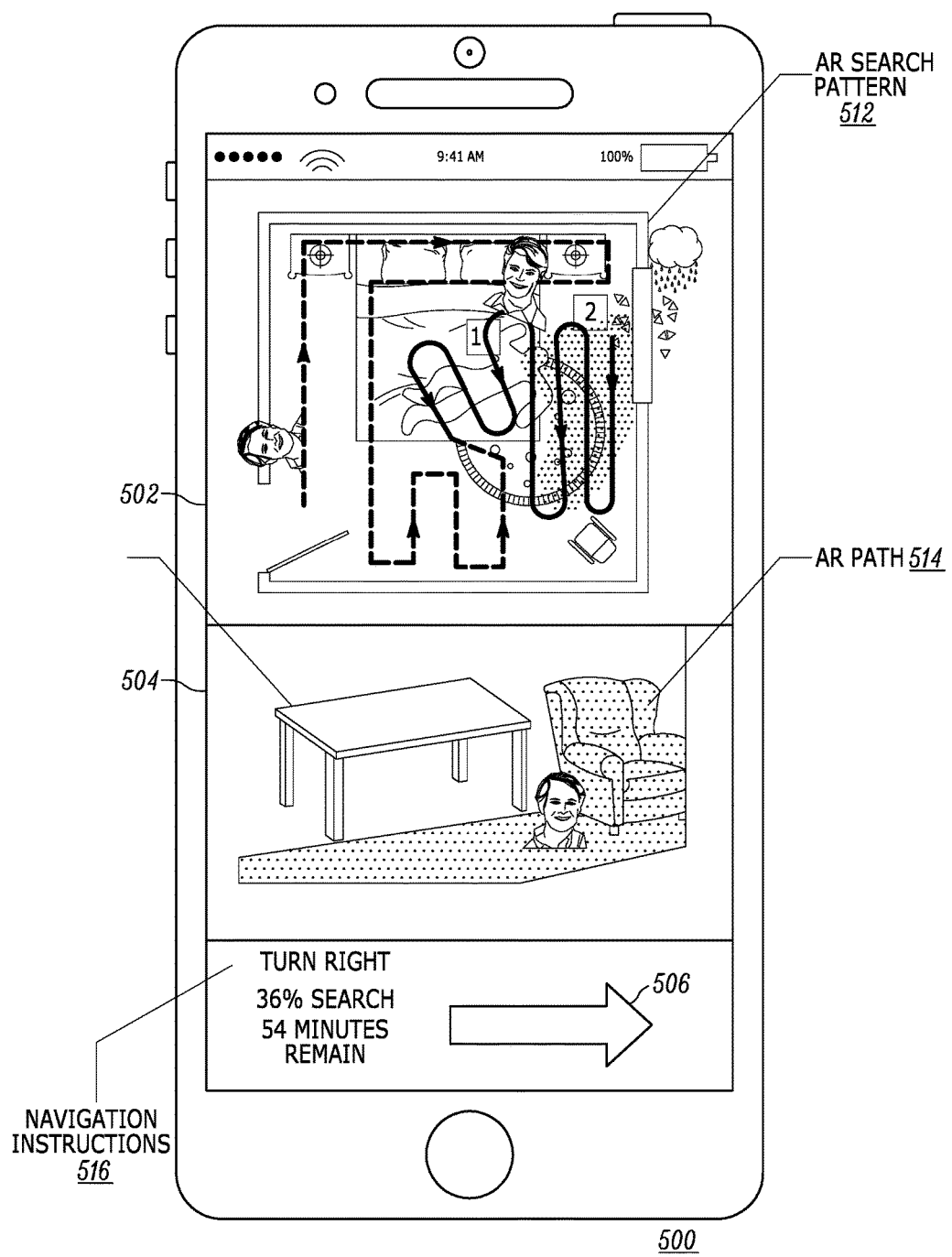
FIG. 5 is an example of a portable communication device formed and operating in accordance with some embodiments.

FIG. 5 is a portable communication device 500 in accordance with some embodiments. Portable communication device 500 is embodied as a smart phone having a display shown in a split view in which an upper portion of the display 502 shows an overall incident scene augmented with a search pattern 512, and a lower portion of the display 504 shows an augmented search pattern 514 on the image captured by the camera of communication device 500 or other device (e.g. body worn camera) and to show specific elements along a portion of the augmented search pattern, such as furniture or evidence, along with a directional navigation arrow 506 and navigation instruction 516. This portion is of particular interest to the user of the portable communication device. The split display allows the user to see an overall incident scene with one more investigator in the room. If the user wishes to pan out, the display can indicate other investigators, for example located elsewhere, such as were shown in FIG. 3E, within previously determined geofenced boundaries of, for example, a home.

Figure 6:
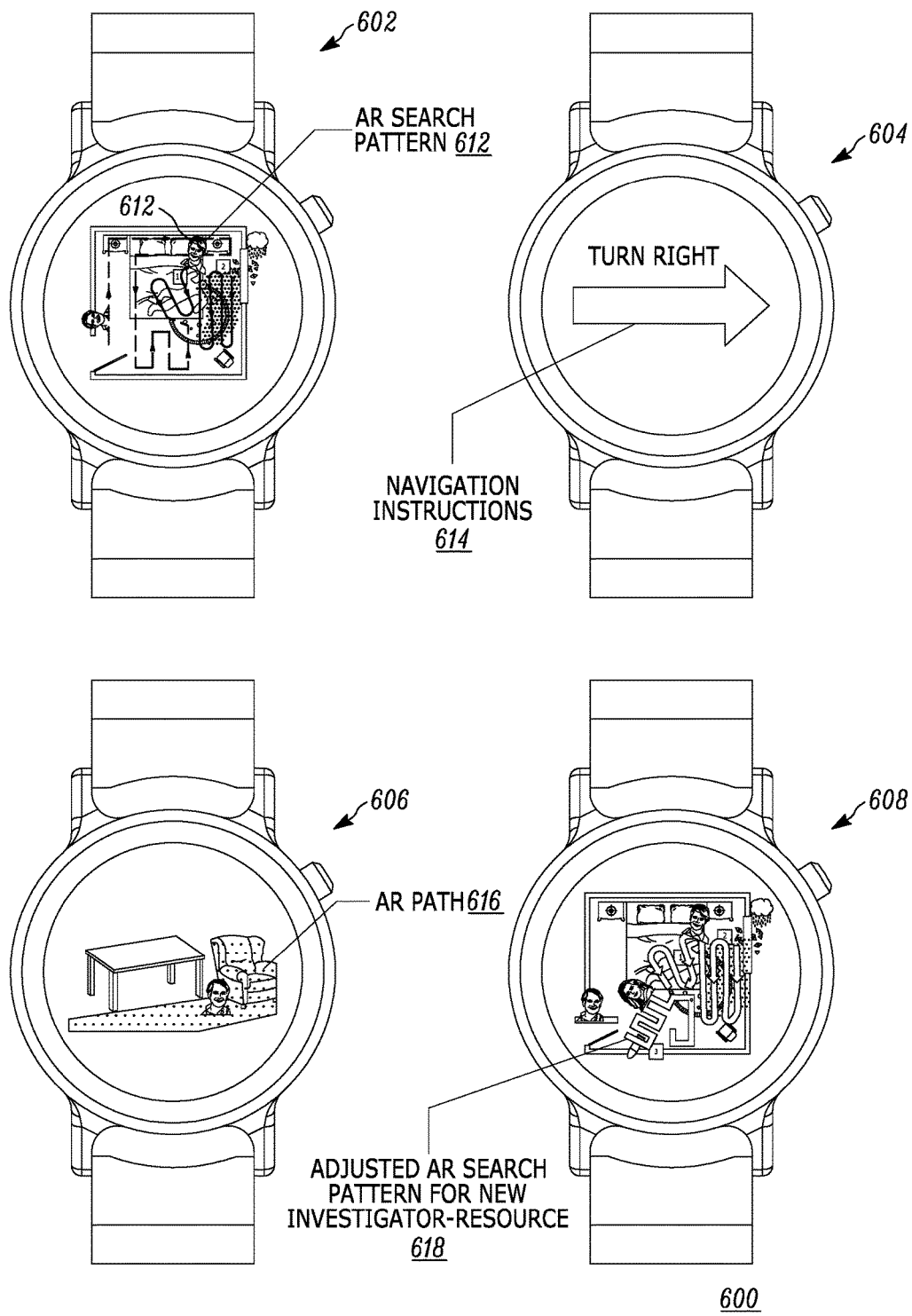
FIG. 6 is another example of a portable communication device formed and operating in accordance with some embodiments.

FIG. 6 is a portable communication device 600 in accordance with some embodiments. Portable communication device 600 is embodied as smart watch which in view 602 shows an incident scene with an over view search pattern 612 for a user of the device/multiple users. For example two patterns for two user-investigators at an incident scene may be shown on the display. View 604 shows the smart watch providing navigation instructions 614 to the user as the user-investigator progresses along the search pattern. View 606 shows an augmented search pattern 616 on the image captured by the camera of communication device 600 or other devices (e.g. body worn camera) an enlarged portion of an area of interest within the display, where the user may have been indicated to pay particular attention to evidence. View 608 shows the smart watch display augmented with an adjusted search pattern 618 for a newly assigned investigator assigned to the scene. For example, a newly assigned pattern for a more experienced investigator-resource arriving upon the incident scene is now shown on the augmented display 608. The user may be redirected or assigned to a different task.

Additionally, the Table below provides a list of a plurality of contextual factors and examples of how each can be applied for intelligent context driven routing of a search pattern. The following Table illustrates samples of examples of operations that can take place in a Calculation Engine as part of the generation of a dynamic context driven search pattern:

| Context Parameter | Dynamic Context driven Search Pattern Example Intelligent Dynamic Context Driven Search Pattern Calculation Engine |
|---|---|
| Weather | IF weather forecast = rainy day OR windy day; THEN higher prioritization weight for unshielded area/broken window/outdoor<br>IF weather forecast = windy day, THEN enlarge search area follow the wind direction |
| Evidence | Prioritize search for area with evidence tagged.<br>Higher priority for evidence type with high risk of evidence loss/contamination (e.g. hair strand, fabric, fingerprint) e.g. hair strand/fabric, near the door with air flow)<br>Recalculate search pattern when new evidence tagged.<br>Follow evidence trajectory for those evidence with trajectory attributed.<br>Auto request for specialist when evidence is tagged with certain specialist requirement (e.g. bullet trajectory, blood spatter)<br>Auto enlarge search area & recalculate & auto assign to each user-investigator when not enough evidence/no expected evidence found.<br>Search pattern thoroughness based on crime type & expected evidence size |
| Scene | Search pattern based on scene layout, furniture position.<br>Higher priority for area with high risk of evidence loss/contamination (e.g. area near to door, window, common pathway)<br>Higher priority for the path that User-investigator will take/walk through/frequently use during investigation.<br>Search pattern based on potential hazard tagged. |
| Individual User | Search pattern calculated based on number of User resources.<br>Re-calculate when new User joins. |
| Resource | Search pattern calculated based on experience, specialty & job function of each incident scene investigator (e.g. first responder, blood splatter specialist)<br>Search pattern calculated based on User profile (E.g. height, physical strength, mental strength)<br>(e.g. height => higher place assigned to taller User-investigator) |
| Tools | Calculate search pattern based on available & number of tools/devices/equipment<br>Assigned area that requires specific tool for user-investigator |
| Time/ | Night prioritize indoor search; Day prioritize Outdoor search |
| Traffic | Prioritize the area that will having rush hour/heavy traffic (e.g. Internet site) |

The Table is provided to show examples only, and is not intended to be limiting, as operations taking place within the Calculation Engine of a portable communication device, as part of the generation of a dynamic context driven search patterns will vary from incident scene to incident scene.

Accordingly, there has been provided a communication system, apparatus and method that provide an improved approach for generating a search pattern for an incident scene. The search patterns are presented, along with areas to focus on as applicable, to each user-investigator via an augmented reality display of a portable communication device. The search pattern provided by the various embodiments is intelligently generated, dynamically updated and can be assigned to different investigators collaborating at an incident scene based on a variety of contextual factors. Weighting factors can be added to the plurality of context factors and assignment to facilitate distinguishing different user-investigators, thereby ensuring that each search pattern is assigned to the most appropriate person.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having,"

"includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of searching an incident scene, comprising:
   displaying an augmented reality view of the incident scene to a display of a portable communication device;
   calculating a search pattern based on context factors pertaining to the incident scene;
   adjusting the displayed calculated search pattern based on attributes associated with each individual investigator and
   displaying the calculated search pattern as part of the augmented reality view to the display.

2. The method of claim 1, further comprising:
   adjusting the displayed search pattern based on weighted factors associated with different context factors.

3. The method of claim 1, further comprising:
   assigning the calculated search pattern to an investigator based on user context; and
   transferring the calculated search pattern to another more appropriate investigator based on user context.

4. The method of claim 1, further comprising:
   automatically requesting, via the portable communication device, a specialist for predetermined types of evidence.

5. A portable communication device, comprising:
   a controller for receiving evidence information pertaining to an incident scene along with a plurality of incident scene context factors pertaining to the evidence information and the incident scene, the controller calculating a search pattern in response thereto based on attributes associated with an individual investigator; and
   a display for displaying the calculated search pattern as part of an augmented reality of the incident scene.

6. The portable communication device of claim 5, wherein the incident scene context factors comprise: weather forecast, evidence type, incident scene type, individual resources, tools, and time associated with the incident scene.

7. The portable communication device of claim 5, wherein the calculated search pattern is adjusted and displayed based on weighted factors associated with different context factors.

8. The portable communication device of claim 5, wherein the calculated search pattern is adjusted and optimized based on real-time changes to the incident scene.

9. A communication system, comprising:
   an evidence database for storing evidence context information entered during an initial walkthrough of an incident scene;
   a search pattern calculation engine for generating a calculated search pattern based on contextual information pertaining to the incident scene, the stored evidence context information, and based on attributes associated with each individual investigator; and
   a portable communication device having a display for dynamically displaying and updating an augmented reality of the incident scene including the calculated search pattern, the calculated search pattern being updated in response to changes in the contextual information of the incident scene.

10. The communication system of claim 9, wherein the portable communication device communicates with the evidence database over a wireless network.

11. The communication system of claim 9, wherein the portable communication device comprises one of: a heads mounted display (HMD), a smart watch, a portable radio, a smart phone, or a tablet.

12. The communication system of claim 9, further comprising:
- databases having stored user-investigator context information for a plurality of user-investigators; and
- the communication system transferring the calculated search pattern to a more appropriate user-investigator upon arrival of that more appropriate user-investigator to the incident scene.

* * * * *